(12) United States Patent
Kanenari et al.

(10) Patent No.: US 8,760,278 B2
(45) Date of Patent: *Jun. 24, 2014

(54) TRANSMISSION DEVICE FOR TRANSMITTING TIRE INFORMATION AND TIRE INFORMATION MONITORING SYSTEM

(75) Inventors: Daisuke Kanenari, Hiratsuka (JP); Yasuhiko Araki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 13/513,057

(22) PCT Filed: Jun. 16, 2011

(86) PCT No.: PCT/JP2011/003422
§ 371 (c)(1),
(2), (4) Date: May 31, 2012

(87) PCT Pub. No.: WO2012/001897
PCT Pub. Date: Jan. 5, 2012

(65) Prior Publication Data
US 2012/0235808 A1    Sep. 20, 2012

(30) Foreign Application Priority Data

Jul. 1, 2010   (JP) .................................. 2010-150941

(51) Int. Cl.
*B60C 23/02*   (2006.01)
(52) U.S. Cl.
USPC ............. 340/445; 73/146.8; 73/49.3; 73/49.7
(58) Field of Classification Search
CPC .................................................. B60C 23/0494
USPC ............. 340/445, 442, 447; 73/146.5, 146.8, 73/49.2, 49.3, 49.7, 48; 116/34
See application file for complete search history.

(56) References Cited

U.S. PATENT DOCUMENTS

| | | | |
|---|---|---|---|
| 2005/0092076 A1* | 5/2005 | Uleski et al. | 73/146.8 |
| 2008/0018445 A1* | 1/2008 | Shimura | 340/442 |
| 2010/0024539 A1 | 2/2010 | Hamm et al. | |

FOREIGN PATENT DOCUMENTS

| | | |
|---|---|---|
| EP | 0 985 560 A2 | 3/2000 |
| FR | 2 884 610 A1 | 10/2006 |

(Continued)

OTHER PUBLICATIONS

International Search Report of corresponding International Application No. PCT/JP2011/003422, dated on Sep. 12, 2011.

(Continued)

*Primary Examiner* — Brian Zimmerman
*Assistant Examiner* — Bhavin M Patel
(74) *Attorney, Agent, or Firm* — Global IP Counselors, LLP

(57) ABSTRACT

A tire information monitoring system includes a transmission device, a receiving device, and a monitoring section. The transmission device includes a sensor which detects tire information, a transmitter which wirelessly transmits the detected tire information and a housing. The housing includes a wall surrounding the sensor and the transmitter, an inner space divided from the tire cavity area by the wall, and an air vent passing through the housing and connecting the inner space and the tire cavity area. An outer opening portion of the air vent formed on a surface of the housing facing the tire cavity area has an opening area of 0.4 mm² or smaller. An inner opening portion of the air vent formed on a surface of the housing facing the inner space has an opening area larger than that of the outer opening portion.

20 Claims, 8 Drawing Sheets

(56) References Cited

FOREIGN PATENT DOCUMENTS

| | | |
|---|---|---|
| JP | H06-069507 U | 9/1994 |
| JP | H11-182654 A | 7/1999 |
| JP | 2007-196834 A | 8/2007 |
| JP | 2007-196834 A | 8/2007 |
| JP | 2007-270915 A | 10/2007 |
| JP | 2007-270915 A | 10/2007 |
| JP | 2008-062730 A | 3/2008 |
| JP | 2008-062730 A | 3/2008 |
| JP | 2009-184412 A | 8/2009 |
| JP | 2009-184412 A | 8/2009 |
| JP | 2010-500859 A | 1/2010 |
| JP | 2010-500859 A | 1/2010 |
| RU | 2349461 C2 | 3/2009 |
| WO | 2008/017537 A2 | 2/2008 |

OTHER PUBLICATIONS

Japanese Office Action of the corresponding Japanese Application No. 2010-150941, dated Dec. 14, 2010.

Japanese Office Action of corresponding Japanese Patent Application No. 2010-150941, dated on Dec. 14, 2010.

Decision to Grant a Patent of corresponding Japanese Patent Application No. 2010-150941, dated on Apr. 12, 2011.

Russian Office Action of the corresponding Russian patent application No. 2012139173, dated Dec. 20, 2013.

* cited by examiner

TRANSMISSION DEVICE FOR TRANSMITTING TIRE INFORMATION AND TIRE INFORMATION MONITORING SYSTEM

TECHNICAL FIELD

The present invention relates to a transmission device provided in a tire cavity area to transmit tire information about a tire condition and a tire information monitoring system for determining whether a tire anomaly is caused.

BACKGROUND ART

Conventionally, a check and control of air pressure of a tire mounted to a vehicle are desired for improvement of tire durability, improvement of wear resistance, improvement of fuel economy, or improvement of ride quality, and improvement of handling performance. For these purposes, various systems for monitoring tire pressure have been proposed. In such a system, in general, information about the air pressure of the tire mounted to a wheel is detected, a transmission device for transmitting the information is provided in a tire cavity area of each wheel, and the information of the air pressure of each tire is obtained from the transmission device to monitor the air pressure of the tire.

On the other hand, when a tire goes flat, a puncture repair agent to be injected into a tire cavity area located between the tire and a rim is often used. Because the puncture repair agent is a liquid, the agent adheres to the transmission device provided in the tire cavity area as well as a tire inner surface facing the tire cavity area when the agent is injected into the tire cavity area. In some cases, the agent becomes solidified to close an opening portion formed in the transmission device to affect measurement of the air pressure.

To cope with this problem, a wheel condition detection device capable of maintaining a normal detection condition by preventing entry of foreign matter through a communication portion for detection has been proposed (Japanese Patent Application Laid-Open No. 2008-62730).

To put it concretely, a TPMS (Tire Pressure Monitoring System) valve of the wheel condition detection device is provided with a communication portion opening and closing mechanism for opening and closing a communication hole formed in a housing. At the time of puncture repair, entry of the puncture repair agent into a detection space through the communication hole is prevented. This communication portion opening and closing mechanism is made up of mechanical bodies including a lid body and a torsion coil spring and automatically opens and closes the communication hole by centrifugal force acting on a wheel.

Moreover, there are proposed a tire pressure monitoring system and a tire pressure sensor unit for informing an occupant that tire pressure may drop after a punctured tire is fixed by using a tire puncture repair agent (Japanese Patent Application Laid-Open No. 2007-196834).

To put it concretely, the tire pressure monitoring system is provided to each tire of a vehicle and is provided with a sensor unit having a tire pressure sensor and a transmitter, a receiving device for receiving a radio wave from the sensor unit, and a control ECU for giving an alarm when the air pressure of each tire becomes lower than or equal to a threshold value. The system is provided with a puncture determination means for determining puncture of each tire and a puncture repair agent use determination means for determining whether or not the punctured tire was repaired by using the puncture repair agent after it was determined that the tire went flat. When it was determined that the punctured tire was repaired by using the puncture repair agent, the control ECU continues the alarm even if the tire pressure value from the air pressure sensor is a normal value.

Because the communication portion opening and closing mechanism of the device described in Japanese Patent Application Laid-Open No. 2008-62730 is made up of the mechanical bodies including the lid body and the torsion coil spring, the device itself is complicated and expensive.

In the system and the unit described in Japanese Patent Application Laid-Open No. 2007-196834, it is not certain whether or not the information about the tire pressure measured after the repair of the tire by using the puncture repair agent is correct. Therefore, it is impossible to determine whether a tire anomaly after the puncture repair is caused.

SUMMARY OF INVENTION

Technical Problem

Therefore, an object of the present invention is to provide a transmission device capable of appropriately detecting and transmitting tire information such as tire pressure information even after tire puncture repair by using a puncture repair agent and a tire information monitoring system for determining whether a tire anomaly is caused.

According to an aspect of the invention, there is provided a transmission device provided in a tire cavity area to transmit tire information about a condition of a tire.

The device includes:

a sensor which detects, as the tire information, a condition of gas filled in the tire cavity area surrounded with the tire and a rim to which the tire is mounted;

a transmitter which wirelessly transmits the detected tire information; and a housing which includes a wall surrounding the sensor and the transmitter, an inner space divided from the tire cavity area by the wall, and an air vent passing through the housing and connecting the inner space and the tire cavity area.

An outer opening portion of the air vent formed on a surface of the housing facing the tire cavity area has an opening area of $0.4\ mm^2$ or smaller.

An inner opening portion of the air vent formed on a surface of the housing facing the inner space has an opening area larger than that of the outer opening portion.

The opening area of the inner opening portion is four times the opening area of the outer opening portion or larger.

A hole cross-sectional area of the air vent increases in a stepwise fashion or continuously from the outer opening portion toward the inner opening portion.

A protruding portion protruding by 1 mm or longer from the surface of the housing toward the tire cavity area is provided to a surface of the housing, and the outer opening portion is formed on a top portion of the protruding portion.

When the protruding portion is cut along a plane including a central axis of the air vent, an inclined face of the protruding portion and facing the tire cavity area protrudes, for example, toward the tire cavity area in a bulge shape.

An edge of the inner opening portion of the air vent is chamfered or rounded.

The inner space includes a sensor space which is provided at least between the air vent and the sensor and which a sensor face of the sensor faces and the sensor space is formed by an inner wall of an inner member provided in the housing and by the wall of the housing, is narrower than an inner area surrounded with the wall of the housing, and has a cross-section widening from the inner opening portion of the air vent.

A guide groove extending from the inner opening portion of the air vent is provided to the wall of the housing and the inner wall of the inner member facing the inner space.

Each of grooves extending in different directions from the inner opening portion is provided as the guide groove to a face of the wall of the housing facing the inner space.

The inner space includes, for example, a reservoir space for storing a liquid that has entered through the air vent and the guide groove is provided to extend toward the reservoir space.

Or, the inner space includes a reservoir space for storing a liquid that has entered through the air vent, the inner opening portion of the air vent is provided to a wall face of the reservoir space, and the inner space includes, besides the reservoir space, the sensor space which branches off from the wall face of the reservoir space and which the sensor face of the sensor faces.

The guide groove forms a flow path of a liquid that has entered the inner space through the air vent.

According to the other aspect of the invention, there is provided a tire information monitoring system.

The system includes: a transmission device; a receiving device; and a monitoring section.

The transmission device includes a sensor which detects, as tire information, a condition of gas filled in a tire cavity area surrounded with a tire and a rim to which the tire is mounted, a transmitter which wirelessly transmits the detected tire information, and a housing which includes a wall surrounding the sensor and the transmitter, an inner space divided from the tire cavity area by the wall, and an air vent passing through the housing and connecting the inner space and the tire cavity area.

An outer opening portion of the air vent formed on a surface of the housing facing the tire cavity area has an opening area of 0.4 mm$^2$ or smaller, an inner opening portion of the air vent formed on a surface of the housing facing the inner space has an opening area larger than that of the outer opening portion On the other hand, the receiving device receives the tire information transmitted from the transmitter.

The monitoring section determines whether a tire anomaly is caused based on the tire information and informs a determination result.

The transmission device and the tire information monitoring system are capable of appropriately measuring and obtaining tire information such as tire pressure information even after tire puncture repair by using a puncture repair agent.

DESCRIPTION OF EMBODIMENTS

A transmission device and a tire information monitoring system of the present invention will be described below in detail.

(Overview of Tire Pressure Monitoring System)

Figure 1:
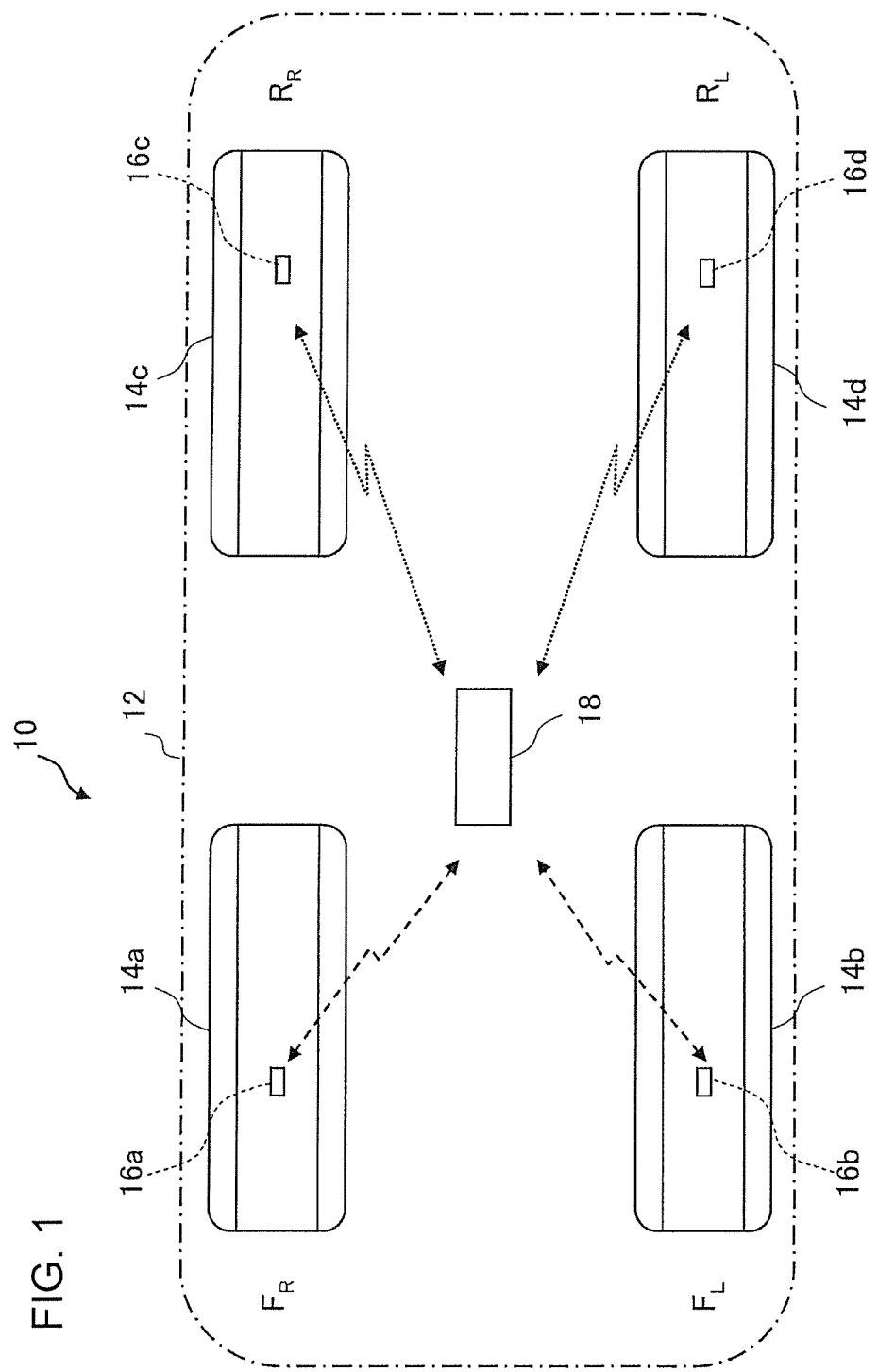
FIG. 1 is a general overview diagram of a tire pressure monitoring system which is an embodiment of a tire information monitoring system.

FIG. 1 is a general overview diagram of a tire pressure monitoring system 10 which is an embodiment of the tire information monitoring system.

The tire pressure monitoring system (hereafter referred to as system) 10 is mounted on a vehicle 12. The system 10 includes air pressure information transmission devices (hereafter referred to as transmission devices) 16a, 16b, 16c, and 16d provided in respective tire cavity areas in tires 14a, 14b, 14c, and 14d of respective wheels of the vehicle 12 and a monitoring device 18.

All of the transmission devices 16a, 16b, 16c, and 16d detect information about pressure of air filled into the tire cavity areas surrounded with the tires and rims as tire information and wirelessly transmit the tire information to the monitoring device 18. Hereafter, to explain all of the transmission devices 16a, 16b, 16c, and 16d at a time, the transmission devices 16a, 16b, 16c, and 16d will be collectively referred to as transmission devices 16.

(Structure of Transmission device)

Figure 2:
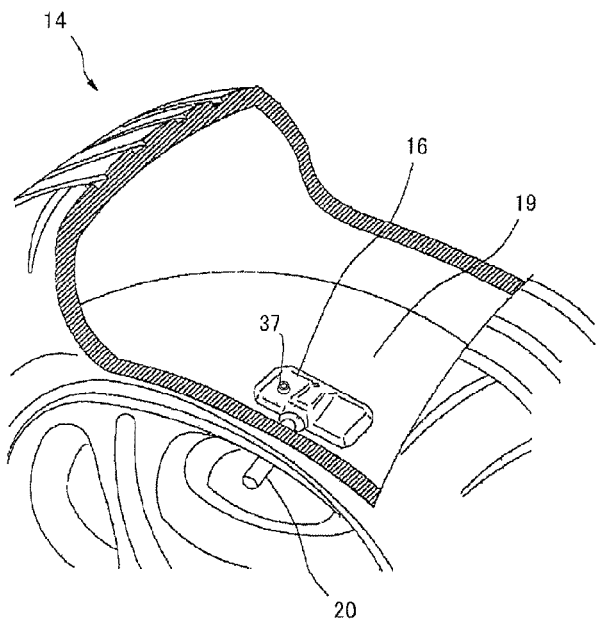
FIG. 2 is a drawing for explaining an example of a method for fixing a transmission device illustrated in FIG. 1 in a tire cavity area.
Figure 3:
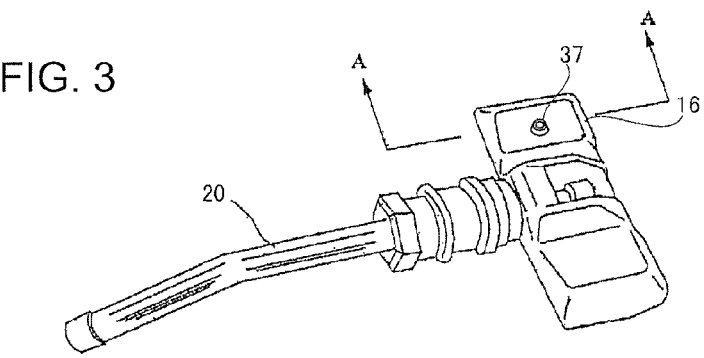
FIG. 3 is a perspective view of an entire device in which a transmission device illustrated in FIG. 2 is integrated with a tire valve.

FIG. 2 is a drawing for explaining an example of a method for fixing the transmission device 16 in the tire cavity area. FIG. 3 is a perspective view of an entire device in which the transmission device 16 illustrated in FIG. 2 is integrated with a tire valve 20.

The transmission device 16 is provided to an end portion of the tire valve 20 extending on a side of the tire cavity area. As illustrated in FIG. 2, the transmission device 16 is fixed and disposed in the tire cavity area by mechanically fixing the tire valve 20 to the rim 19.

Figure 4:
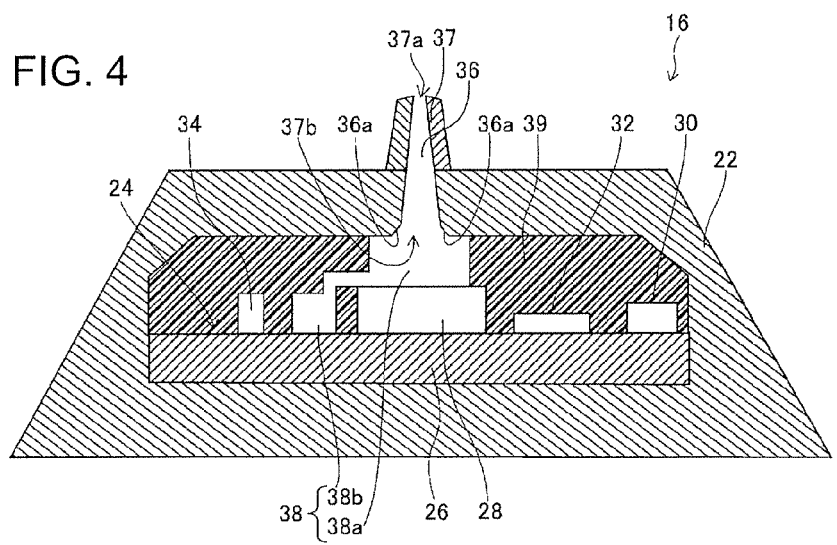
FIG. 4 is a cross-sectional view of the transmission device taken along a line of A-A illustrated in FIG. 3.

FIG. 4 is a cross-sectional view of the transmission device 16 taken along a line of A-A illustrated in FIG. 3. As illustrated in FIG. 4, the transmission device 16 includes a housing 22 and a circuit 24 provided in the housing 22. The circuit 24 includes a substrate 26 and a sensor unit 28, a transmitter 30, a processing unit 32, a power supply section 34, and an antenna 40 (see FIG. 5) provided to the substrate 26. In the housing 22, an inner space 38 is formed and the inner space 38 has a sensor space 38a and a reservoir space 38b for collecting and storing the liquid such as the puncture repair agent that has entered the inner space 38.

The housing 22 is provided with an air vent 36 connecting the inner space 38 in the housing 22 and a tire cavity area and passing through the housing 22. A protruding portion 37 protruding toward the tire cavity area is provided to a surface of the housing 22. An outer opening portion 37a of the air vent 36 is formed on a top portion of the protruding portion 37. On the other hand, an inner opening portion 37b of the air vent 36 is formed in an inner surface of the housing 22 where the air vent 36 faces the inner space 38 (the sensor space 38a).

The sensor space 38a is formed between the air vent 36 and a sensor unit 28 and a sensor face of the sensor unit 28 faces the sensor space 38a.

An opening area of the outer opening portion 37a of the air vent 36 is 0.4 mm$^2$ or smaller. Because the opening area of the outer opening portion 37a is 0.4 mm$^2$ or smaller, the liquid such as the puncture repair agent becomes less likely to enter the air vent 36. The inner opening portion 37b of the air vent 36 has a larger opening area than the outer opening portion 37a. The air vent 36, the outer opening portion 37a and the inner opening portion 37b are described below.

In an inner area surrounded with a wall of the housing 22, sealing resin 39 is filled as an inner member while remaining the inner space 38. In other words, the inner space 38 is formed by inner wall faces of the housing 22 and inner walls of the inner member provided to the housing 22. Therefore, the inner space 38 is smaller than the inner area surrounded with the wall of the housing 22. Moreover, as illustrated in FIG. 4, a cross-section of the sensor space 38a increases from a cross-section of the inner opening portion 37b of the air vent 36.

In the housing 22, the air vent 36 is provided as only one passage connecting the tire cavity area and the inner space 38. This is because, it is extremely easy for the liquid such as the puncture repair agent to enter the air vents 36 if there are a plurality of air vents 36. By providing the air vent 36 as the only one passage connecting the tire cavity area and the inner space 38, the liquid such as the puncture repair agent becomes less likely to enter the inner space 38 against pressure in the closed inner space 38 when the liquid such as the puncture repair agent closes the outer opening portion 37a.

Although at least one of the wall faces of the inner space 38 is formed by the sealing resin 39, the inner member is not limited to the sealing resin 39. As the inner member, a resin material formed into a predetermined shape may be disposed.

Figure 5:
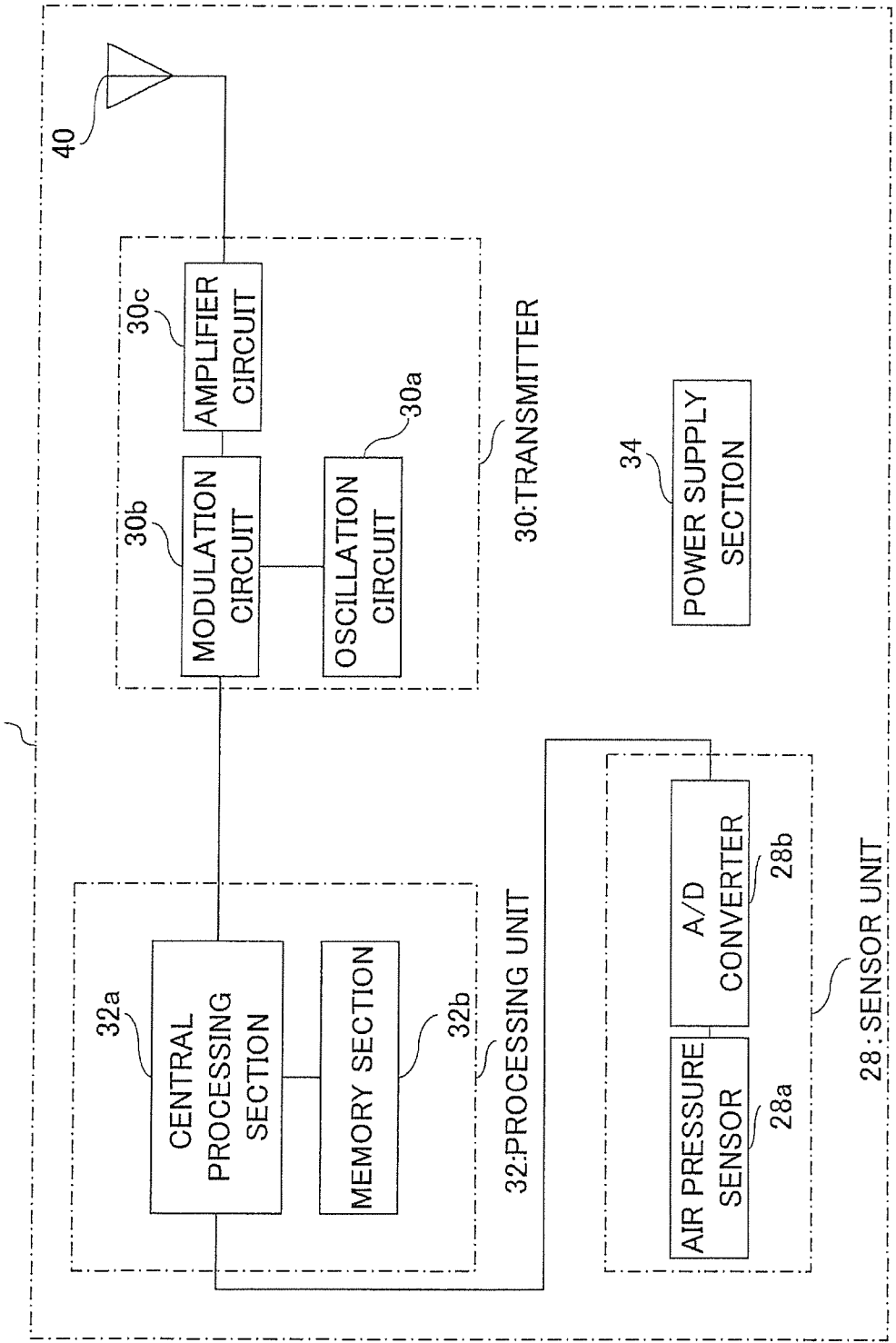
FIG. 5 is a circuit block diagram of the transmission device illustrated in FIG. 1.

FIG. 5 is a circuit block diagram of the transmission device 16.

The sensor unit 28 includes an air pressure sensor 28a and an AM converter 28b. The air pressure sensor 28a senses the air pressure in an inner space 38 in the housing 22 and outputs a pressure signal. The inner space 38 in the housing 22 communicates with the space in the tire cavity area through an air vent 36 (see FIG. 4) provided in the housing 22.

The A/D converter 28b carries out digital conversion of the pressure signal output from the air pressure sensor 28a and outputs pressure data.

The processing unit 32 includes a central processing section 32a and a memory section 32b. The central processing section 32a operates based on a program stored in a semiconductor memory of the memory section 32b. When the central processing section 32a is powered and driven, it carries out control so that the pressure data, which is information about the air pressure and sent from the sensor unit 28, is transmitted to the monitoring device 18 via the transmitter 30 at predetermined time intervals, e.g., every five minutes. Identification information unique to the transmission device 16 is stored in advance in the memory section 32b and the central processing section 32a carries out control so that the identification information is transmitted to the monitoring device 18 together with the pressure data.

The memory section 32b includes a ROM for storing the program for operation of the central processing section 32a and rewritable nonvolatile memory such as an EEPROM. The identification information unique to the transmission device 16 is stored in an unwritable area in the memory section 32b.

The transmitter 30 includes an oscillation circuit 30a, a modulation circuit 30b, and an amplifier circuit 30c.

The oscillation circuit 30a generates a carrier signal, e.g., an RF signal belonging to a 315 MHz frequency band.

The modulation circuit 30b modulates the carrier signal by using the pressure data sent from the central processing section 32a and the identification information unique to the transmission device 16 to generate a transmitting signal. As a modulation method, a method such as amplitude shift keying (ASK), frequency modulation (FM), frequency shift keying (FSK), phase modulation (PM), and phase shift keying (PSK) can be used.

The amplifier circuit 30c amplifies the transmitting signal generated by the modulation circuit 30b. The amplified transmitting signal is wirelessly transmitted to the monitoring device 18 via the antenna 40.

A secondary battery, for example, is used as the power supply section 34 to supply electric power to the sensor unit 28, the transmitter 30, and the processing unit 32.

(Structure of Monitoring Device)

Figure 6:
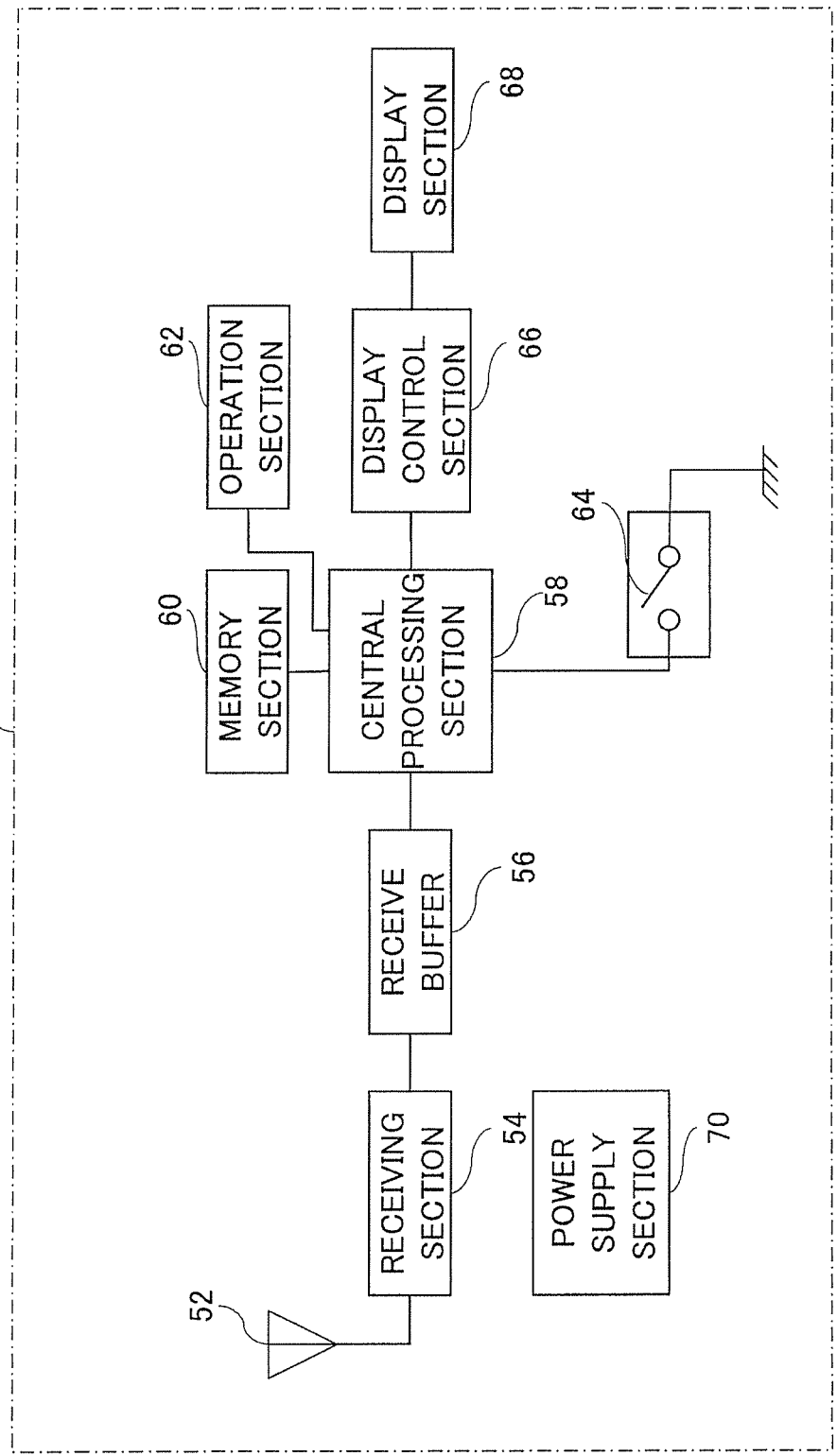
FIG. 6 is a circuit block diagram of a monitoring device illustrated in FIG. 1.

FIG. 6 is a circuit block diagram of the monitoring device 18.

The monitoring device 18 is installed in front of a position of a driver's seat of the vehicle 10, for example, and informs a driver of the information about the air pressure. The monitoring device 18 includes an antenna 52, a receiving section 54, a receive buffer 56, a central processing section 58, a memory section 60, an operation section 62, a switch 64, a display control section 66, a display section 68, and a power supply section 70.

Frequency of the antenna 52 is matched to transmit frequency of the transmission device 16 and the antenna 52 is connected to the receiving section 54.

The receiving section 54 receives the transmitting signal of a predetermined frequency and sent from the transmission device 16 and demodulates the signal to take out the pressure data and the data of the identification information. These pieces of data are output to the receive buffer 56.

The receive buffer 56 temporarily stores the pressure data and the data of the identification information output from the receiving section 54. The stored pressure data and the data of the identification information are output to the central processing section 58 according to a direction of the central processing section 58.

The central processing section 58 is mainly made up of a CPU and operates based on a program stored in the memory section 60. The central processing section 58 monitors the air pressure of each of the tires 14a to 14d for each piece of identification information based on the received pressure data and data of the identification information. To put it concretely, the central processing section 58 determines whether a tire anomaly is caused based on the pressure data and informs a determination result to a driver. Determination of whether the tire anomaly is caused is to determine whether or not the air pressure dropped to an abnormally low level or dropped sharply in a short period of time to show that the tire blew out, for example.

The central processing section 58 outputs a determination result to the display control section 66 and causes the display section 68 to output the determination result through the display control section 66.

Furthermore, the central processing section 58 initializes a communication method and the like with the transmission device 16 according to information from the operation section 62 and information from the switch 64. Moreover, the central processing section 58 can set determination conditions for determining whether the tire anomaly is caused according to the information from the operation section 62.

The memory section 60 includes a ROM for storing the program for operation of the CPU of the central processing section 58 and a nonvolatile memory such as an EEPROM. A table of the communication method with the transmission device 16 is stored in the memory section 60 during manufacture. The transmission device 16 and the monitoring device 18 communicate with each other by the preset communication method at an early stage. The communication method table includes information such as a communication protocol, a transmission bit rate, and a data format corresponding to the identification information unique to the transmission device 16. Settings of these pieces of information can be more freely changed by means of input from the operation section 62.

The operation section 62 includes an input device such as a keyboard and is used to input various kinds of information and conditions. The switch 64 is used to direct the central processing section 58 to start initialization.

The display control section 66 controls the display section 68 to display the tire pressure corresponding to the mounted position of each of the tires 14a to 14d according to the determination result from the central processing section 58. At the same time, the display control section 66 carries out control to cause the display section 68 to display also the determination result that the tire has blown out, for example.

The power supply section 70 controls electric power supplied from a battery mounted to the vehicle 12 to suitable voltages and supplies them to respective portions of the monitoring device 18 via a power-supply line (not shown in the figure).

The transmission device 16 and the monitoring device 18 are formed as described above.

As described above, a cross-sectional area of the air vent 36 connecting the inner space 38 of the housing 22 of the transmission device 16 and the tire cavity area continuously increases as it goes from the outer opening portion 37a toward the inner opening portion 37b.

The outer opening portion 37a of the air vent 36 is formed on the top portion of the protruding portion 37 protruding by 1 mm or longer from the surface of the housing 22 toward the tire cavity area. By forming the outer opening portion 37a on the top portion of the protruding portion 37, it is possible to prevent the puncture repair agent from adhering to the outer opening portion 37a even if the puncture repair agent is introduced into the tire cavity area for puncture repair. Especially because the protruding portion 37 is provided to the housing 22 to protrude outward in a radial direction of a tire, it is possible to cast off the puncture repair agent, that has adhered to the protruding portion 37, outward in the radial direction of the tire due to centrifugal force caused by rolling of the tire. As a result, it is possible to effectively prevent adhesion of the puncture repair agent to the outer opening portion 37a.

Moreover, by changing the cross-section of the air vent 36 instead of making it uniform, surface tension in a vicinity of the inner opening portion 37b is smaller than that in a vicinity of the outer opening portion 37a and a capillary phenomenon becomes less likely to occur, which makes it difficult for the puncture repair agent to enter the air vent 36. If the puncture repair agent enters the air vent 36, the opening area of the inner opening portion 37b is larger than that of the outer opening portion 37a and therefore, the puncture repair agent does not stay in the air vent 36 but swiftly moves into the inner space 38.

The opening area of the inner opening portion 37b is preferably four times the opening area of the outer opening portion 37a or larger in order to prevent the puncture repair agent from entering the air vent 36 and from closing the air vent 36.

The inner opening portion 37b of the air vent 36 is provided with a chamfer 36a to prevent the puncture repair agent from staying and it is allowed to swiftly flow out of the air vent 36. Instead of the chamfer 36a, the edge of the inner opening portion 37b may be rounded with a curvature.

Figure 7:
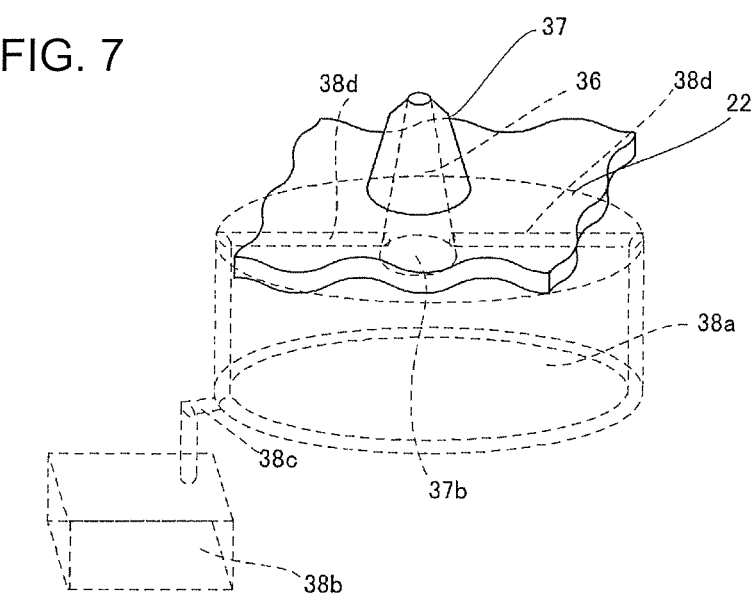
FIG. 7 is a drawing for explaining an inner space in the transmission device illustrated in FIG. 4.

FIG. 7 is a drawing for explaining the inner space 38 in the transmission device 16 illustrated in FIG. 4.

In the inner space 38, the sensor space 38a which the sensor face of the sensor unit 28 faces is formed between the air vent 36 and the sensor unit 28 and is formed by inner walls of the sealing resin 39 provided in the housing 22 as well as the inner walls of the housing 22. The sensor space 38a is smaller than the inner area surrounded with the inner walls of the housing 22 and a cross-sectional area of the sensor space 38a increases from that of the inner opening portion 37b of the air vent 36.

The reservoir space 38b is provided separately from the sensor space 38a and connected to the sensor space 38a through a connecting pipe 38c.

The sensor space 38a is in a cylindrical shape and grooves 38d extending from the inner opening portion 37b are formed in a wall face (ceiling face) of the sensor space 38a provided with the inner opening portion 37b. The inner opening portion 37b illustrated in FIG. 7 is formed substantially at a center of the circular wall face (ceiling face) and two grooves 38d extend in different directions from the inner opening portion 37b. In a side face of the cylindrical sensor space 38a in the drawing, the two grooves 38d extend to a wall face which is a bottom face in the drawing. The grooves 38d extending from the side face extend to an edge of the circular wall face which is the bottom face in the drawing and the two grooves 38d extend along the edge of the bottom face and are connected to the connecting pipe 38c. Therefore, the liquid such as the puncture repair agent that has entered the sensor space 38a from the inner opening portion 37b is guided by the grooves 38d, flows into the connecting pipe 38c, and is stored in the reservoir space 38b. In other words, the grooves 38d serve as guide grooves for the puncture repair agent.

Because the cross-sectional area of the air vent 36 increases from the outer opening portion 37a toward the inner opening portion 37b as described above, the capillary phenomenon is less likely to occur and the liquid such as the puncture repair agent is less likely to enter the air vent 36 from the outer opening portion 37a as compared with a prior-art case in which the cross-sectional area of the air vent is uniform. Even if the liquid such as the puncture repair agent enters the inner space 38, it does not stay in the air vent 36 but flows into the inner space 38 (sensor space 38a) and eventually flows into the reservoir space 38b along the grooves 38d. As a result, it is possible to prevent the liquid such as the puncture repair agent from adhering to the sensor face and inhibiting operation of the sensor in the sensor space 38a.

Although the two grooves 38d extend from the inner opening portion 37b in the example illustrated in FIG. 7, the number of the grooves 38d may be one, three, or more. However, it is preferable to provide three or more grooves 38d in order to efficiently allow the liquid such as the puncture repair agent to flow into the reservoir space 38b.

(First Modification)

Figure 8A:
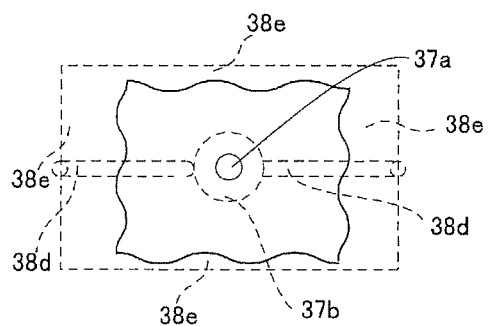
FIGS. 8A and 8B are drawings for explaining an example of an inner space different from the inner space illustrated in FIG. 7.
Figure 8B:
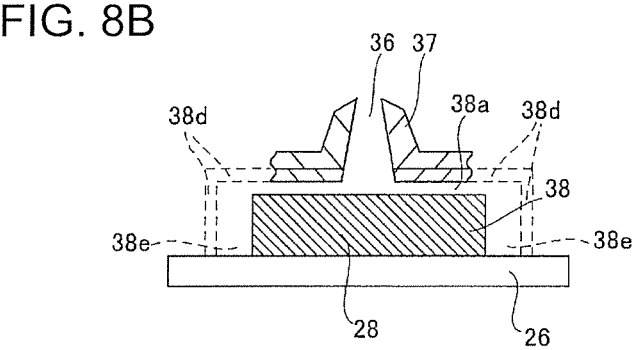

FIGS. 8A and 8B are drawings for explaining an example (first modification) of a reservoir space 38e different from the reservoir space 38b illustrated in FIG. 7. FIG. 8A is a top view and FIG. 8B is a side view.

The inner space 38 includes the sensor space 38a and the reservoir space 38e. The reservoir space 38e is provided closer to the substrate 26 than the sensor space 38a.

The sensor space 38a is provided between the air vent 36 and the sensor unit 28. The reservoir space 38e is provided to surround the sensor unit 28. In a wall face of the sensor space 38a provided with the inner opening portion 37b, the grooves 38d extending from the inner opening portion 37b toward the reservoir space 38e are formed.

Therefore, in the first modification illustrated in FIGS. 8A and 8B, similarly to the example illustrated in FIG. 7, even if the liquid such as the puncture repair agent adheres to the outer opening portion 37a, the cross-sectional area of the air vent 36 increases from the outer opening portion 37a toward the inner opening portion 37b and therefore the liquid such as the puncture repair agent is less likely to enter as compared with the prior art in which the cross-sectional area of the air vent is uniform. Even if the liquid such as the puncture repair agent enters the inner space 38, it does not stay in the air vent 36 but flows into the inner space 38 and eventually flows into the reservoir space 38e along the grooves 38d. As a result, it is possible to prevent the liquid such as the puncture repair agent from wetting the sensor face and inhibiting operation of the sensor in the sensor space 38a.

(Second Modification)

Figure 9A:
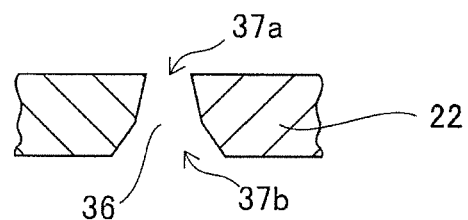
FIGS. 9A and 9B are drawings for explaining other examples of an air vent of the transmission device illustrated in FIG. 4.

FIG. 9A is a drawing for explaining a modification of the air vent 36 of the transmission device 16 illustrated in FIG. 4. Although the cross-sectional area of the air vent 36 increases from the outer opening portion 37a toward the inner opening portion 37b, the air vent 36 is different from the air vent 36 illustrated in FIG. 4. In the modification illustrated in FIG. 9A, the protruding portion 37 is not provided to the housing 22, the outer opening portion 37a of the air vent 36 is provided to an outer wall surface of the housing 22. The edge of the inner opening portion 37b of the air vent 36 is chamfered.

In such an air vent 36, even if the liquid such as the puncture repair agent adheres to the outer opening portion 37a, the cross-sectional area of the air vent 36 increases from the outer opening portion 37a toward the inner opening portion 37b and therefore the capillary phenomenon is less likely to occur and the liquid such as the puncture repair agent is less likely to enter the air vent 36 and the inner space 38 as compared with the prior-art case in which the cross-sectional area of the air vent is uniform.

(Third Modification)

Figure 9B:
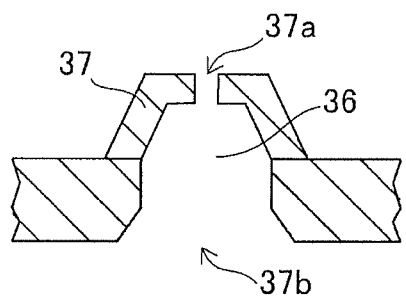

FIG. 9B is a drawing for explaining yet another modification of the air vent 36 of the transmission device 16 illustrated in FIG. 4. The air vent 36 illustrated in FIG. 9B is different from the air vent 36 illustrated in FIG. 4 in that its cross-sectional area increases in a stepwise fashion from the outer opening portion 37a toward the inner opening portion 37b. The edge of the inner opening portion 37b of the air vent 36 is chamfered.

In such an air vent 36, even if the liquid such as the puncture repair agent adheres to the outer opening portion 37a, the cross-sectional area of the air vent 36 increases in the stepwise fashion from the outer opening portion 37a toward the inner opening portion 37b and therefore the capillary phenomenon is less likely to occur and the liquid such as the puncture repair agent is less likely to enter the air vent 36 and the inner space 38 as compared with the prior-art case in which the cross-sectional area of the air vent is uniform.

(Fourth Modification)

Figure 10:
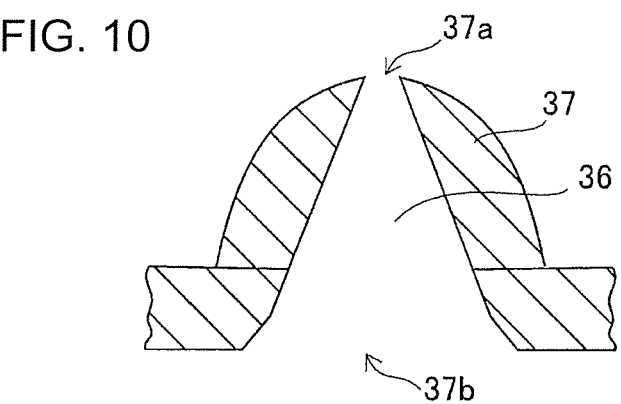
FIG. 10 is a drawing for explaining another example of an air vent and a protruding portion of the transmission device illustrated in FIG. 4.

FIG. 10 is a drawing for explaining another modification of the protruding portion 37 of the transmission device 16 illustrated in FIG. 4. In the case of the protruding portion 37 illustrated in FIG. 4, when the protruding portion 37 is cut along a plane including a central axis of the air vent 36, the inclined face of the protruding portion 37 facing the tire cavity area is provided with a bent portion, where the inclination angle reduces from one to another, on its way to the top portion of the protruding portion 37. As a result, the inclined face has the bulged shape toward the tire cavity area.

On the other hand, in the modification illustrated in FIG. 10, the inclined face of the protruding portion 37 is formed in a curved shape to form a bulge portion toward the tire cavity area.

By forming the inclined face of the protruding portion 37 in the bulge shape toward the tire cavity area in this manner, it is possible to efficiently provide the air vent 36 having the cross-sectional shape increasing from the outer opening portion 37a toward the inner opening portion 37b. If the inclined face of the protruding portion 37 is in a recessed shape toward the tire cavity area, the wall can be thin in a thickness between the inclined face and an inner surface of the air vent having the cross-sectional area increasing from the outer opening portion toward the inner opening portion. Then the protruding portion 37 may be deformed under small external force (e.g., force received at the time of attachment or detachment of the tire to or from the rim). Therefore, it is preferable to form the inclined face of the protruding portion 37 into the bulge shape toward the tire cavity area.

(Fifth Modification)

Figure 11A:
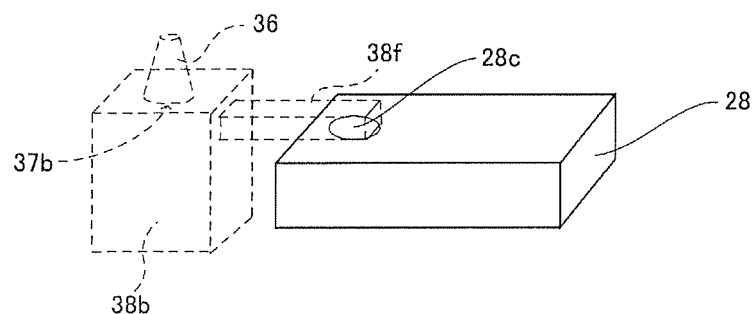
FIGS. 11A and 11B are drawings for explaining examples of an inner space different from the inner space illustrated in FIG. 7.
Figure 11B:
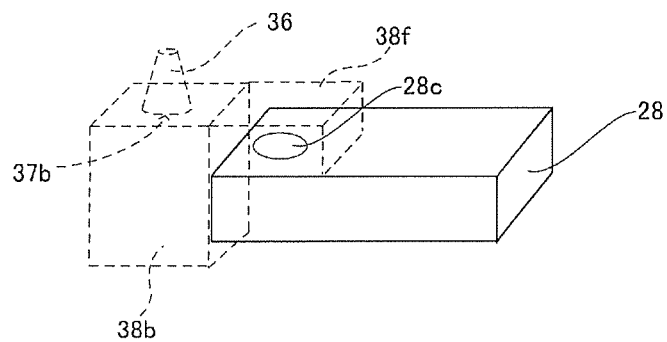

FIGS. 11A and 11B are drawings for explaining modifications of the inner space different from the inner space 38 illustrated in FIG. 7.

The housing 22 is provided with the reservoir space 38b for storing the liquid such as the puncture repair agent that has entered the inner space 38 through the air vent 36.

The reservoir space 38b is provided to be adjacent to the air vent 36 and the inner opening portion 37b of the air vent 36 is formed in a wall face of the reservoir space 38b. Furthermore, a sensor space 38f branches off from the wall face of the reservoir space 37b. A sensor face 28c (e.g., a diaphragm) of the sensor unit 28 faces the sensor space 38f. The sensor space 38f may be a narrow branch space corresponding to a width of the sensor face 28c as illustrated in FIG. 11A or may be a branch space wide enough to surround the sensor face 28c as illustrated in FIG. 11B.

By disposing such a reservoir space 38b, the liquid such as the puncture repair agent does not reach the sensor space 38f but is stored in the reservoir space 38b and therefore it is possible to prevent the liquid such as the puncture repair agent from wetting the sensor face and inhibiting operation of the sensor.

Although the transmission device and the tire information monitoring system according to the invention have been described above in detail, the transmission device and the tire information monitoring system according to the invention are not limited to the embodiments described above but may be improved or modified in various ways without departing from the gist of the invention.

DESCRIPTION OF REFERENCE NUMERALS 10 tire pressure monitoring system
12 vehicle
14, 14a, 14b, 14c, 14d tire
16, 16a, 16b, 16c, 16d air pressure information transmission device
18 monitoring device
19 rim
20 tire valve
22 housing 24 circuit
26 substrate
28 sensor unit
28a air pressure sensor
28b A/D converter
28c sensor face
30 transmitter
32 processing unit
34 power supply section
36 air vent
37 protruding portion
37a outer opening portion
37b inner opening portion
38 inner space
38a, 38f sensor space
38b, 38e reservoir space
38c connecting pipe
38d groove
39 sealing resin
40 antenna
42 opening portion
52 antenna
54 receiving section
56 receive buffer
58 central processing section
60 memory section
62 operation section
64 switch
66 display control section
68 display section
70 power supply section

The invention claimed is:

1. A transmission device provided in a tire cavity area to transmit tire information about a condition of a tire, the transmission device comprising:
   a sensor configured to detect, as the tire information, a condition of gas filled in the tire cavity area surrounded with the tire and a rim to which the tire is mounted;
   a transmitter configured to wirelessly transmit the detected tire information;
   a housing which includes a wall surrounding the sensor and the transmitter;
   an inner member provided in the housing;
   an inner space that is divided from the tire cavity area by the wall and an inner wall of the inner member, and that a sensor face of the sensor faces; and
   an air vent that passes through the housing and connects the inner space and the tire cavity area, the air vent having an outer opening portion that is formed on an outer surface of the housing facing the tire cavity area and an inner opening portion that is formed on a surface of the housing facing the inner space, the outer opening portion having an opening area of 0.4 mm$^2$ or smaller, the inner opening portion having an opening area larger than that of the outer opening portion, and a hole cross-sectional area of the air vent increasing in a stepwise fashion or continuously from the outer opening portion toward the inner opening portion.

2. The transmission device according to claim 1, wherein the opening area of the inner opening portion is at least four times the opening area of the outer opening portion.

3. The transmission device according to claim 1, wherein the housing includes a surface from which a protruding portion protrudes by 1 mm or longer from the surface of the housing toward the tire cavity area; and
   the outer opening portion is formed on a top portion of the protruding portion.

4. The transmission device according to claim 3, wherein when the protruding portion is cut along a plane including a central axis of the air vent, an inclined face of the protruding portion facing the tire cavity area protrudes toward the tire cavity area in a bulge shape.

5. The transmission device according to claim 1, wherein an edge of the inner opening portion of the air vent is chamfered or rounded.

6. The transmission device according to claim 1, wherein the inner space has a cross-section widening from the inner opening portion of the air vent.

7. The transmission device according to claim 6, wherein a guide groove arrangement extending from the inner opening portion of the air vent is present in the wall of the housing and the inner wall of the inner member facing the inner space.

8. The transmission device according to claim 7, wherein the guide groove arrangement includes a plurality of grooves extending in different directions from the inner opening portion to a face of the wall of the housing facing the inner space.

9. The transmission device according to claim 7, wherein the inner space includes a reservoir space configured to store a liquid that has entered through the air vent; and
the guide groove arrangement extends toward the reservoir space.

10. The transmission device according to claim 1, wherein the inner space includes a reservoir space configured to store a liquid that has entered through the air vent;
the inner opening portion of the air vent is provided to a wall face of the reservoir space; and
the inner space includes the reservoir space and a sensor space which branches off from the wall face of the reservoir space and which the sensor face of the sensor faces.

11. The transmission device according to claim 7, wherein the guide groove arrangement is configured to form a flow path of a liquid that has entered the inner space through the air vent.

12. A tire information monitoring system comprising:
a transmission device-including:
   a sensor configured to detect, as tire information, a condition of gas filled in a tire cavity area surrounded with a tire and a rim to which the tire is mounted;
   a transmitter configured to wirelessly transmits the detected tire information;
   a housing which includes a wall surrounding the sensor and the transmitter;
   an inner member provided in the housing;
   an inner space that is divided from the tire cavity area by the wall and an inner wall of the inner member, and that a sensor face of the sensor faces; and
   an air vent that passes through the housing and connects the inner space and the tire cavity area, the air vent having an outer opening portion that is formed on an outer surface of the housing facing the tire cavity area, and an inner opening portion that is formed on a surface of the housing facing the inner space, the outer opening portion having an opening area of 0.4 mm$^2$ or smaller, the inner opening portion having an opening area larger than that of the outer opening portion, and a hole cross-sectional area of the air vent increasing in a stepwise fashion or continuously from the outer opening portion toward the inner opening portion;
a receiving device configured to receive the tire information transmitted from the transmitter; and a monitoring section configured to determine whether a tire anomaly exists based on the tire information and provide a determination result.

13. The transmission device according to claim 2, wherein the housing includes a surface from which a protruding portion protrudes by 1 mm or longer from the surface of the housing toward the tire cavity area; and the outer opening portion is formed on a top portion of the protruding portion.

14. The transmission device according to claim 2, wherein an edge of the inner opening portion of the air vent is chamfered or rounded.

15. The transmission device according to claim 2, wherein the inner space includes a sensor space which is provided at least between the air vent and the sensor and which a sensor face of the sensor faces; and the sensor space is formed by an inner wall of an inner member provided in the housing and by the wall of the housing, is narrower than an inner area surrounded with the wall of the housing, and has a cross-section widening from the inner opening portion of the air vent.

16. The transmission device according to claim 8, wherein the inner space includes a reservoir space configured to store a liquid that has entered through the air vent; and the guide groove extends toward the reservoir space.

17. The transmission device according to claim 2, wherein the inner space includes a reservoir space configured to store a liquid that has entered through the air vent;

the inner opening portion of the air vent is provided to a wall face of the reservoir space; and the inner space includes the reservoir space and a sensor space which branches off from the wall face of the reservoir space and which the sensor face of the sensor faces.

18. The transmission device according to claim 3, wherein an edge of the inner opening portion of the air vent is chamfered or rounded.

19. The transmission device according to claim 3, wherein the inner space includes a sensor space which is provided at least between the air vent and the sensor and which a sensor face of the sensor faces; and the sensor space is formed by an inner wall of an inner member provided in the housing and by the wall of the housing, is narrower than an inner area surrounded with the wall of the housing, and has a cross-section widening from the inner opening portion of the air vent.

20. The transmission device according to claim 3, wherein the inner space includes a reservoir space configured to store a liquid that has entered through the air vent;

the inner opening portion of the air vent is provided to a wall face of the reservoir space; and the inner space includes the reservoir space and a sensor space which branches off from the wall face of the reservoir space and which the sensor face of the sensor faces.

\* \* \* \* \*